United States Patent Office 3,029,299
Patented Apr. 10, 1962

3,029,299
SIMULTANEOUS MANUFACTURE OF TRI- AND TETRACHLORETHYLENE
Robert Thermet, Grenoble, and Ludovic Parvi, Pont-de-Claix, France, assignors to Societe d'Electro-Chimie, d'Electro-Metallurgie et des Acieries Electriques d'Ugine, Paris, France, a corporation of France
No Drawing. Filed Feb. 3, 1958, Ser. No. 712,651
Claims priority, application France Feb. 8, 1957
22 Claims. (Cl. 260—654)

The present invention relates to a method of simultaneous production of tri- and tetrachlor-ethylene by the chlorination of 1,2 dichlor-ethylene.

In order to obtain trichlor-ethylene, it is the usual practice to start with acetylene and to convert the latter to tetrachlor-ethane by the addition of chlorine, the tetrachlorethane being subjected to a de-hydrochlorination, which means that there is removed from its molecule a molecule of hydrochloric acid by forming an ethylenic bond. In order to effect this dehydrochlorination, the means most usually employed are either the thermic scission of tetrachlor-ethane between 200 and 400° C. in the presence or absence of a catalyst, or alternatively the action of a slightly alkaline agent such as a slightly basic metallic hydroxide or a metallic oxide, lime being the alkaline agent which is most frequently used.

In order to obtain tetrachlor-ethylene, it is also known to start with acetylene and to pass successively through the intermediary of tetrachlor-ethane, trichlor-ethylene and pentachlor-ethane. The latter, de-hydrochlorinated in the same manner as the tetrachlor-ethane, is converted to tetrachlor-ethylene. The passage through tetra- and pentachlor-ethane has however, a large number of drawbacks, in particular because of their toxic nature, of their high boiling points, of the difficulties of elimination of the chloride of iron generally used as the chlorination catalyst, and of the presence of condensed by-products due to the use of chloride of iron.

On the other hand, thermic scission, with or without a catalyst, which produces trichlor-ethylene and tetrachlor-ethylene by de-hydrochlorination of tetrachlor-ethane and pentachlor-ethane respectively is an endothermic reaction, the application of which requires a supplement of heat in the reaction zone. The effect of de-hydrochlorination becomes more complete as the catalyst used is more active.

In certain processes, it has been sought to produce the supplement of heat necessary to maintain the temperature of de-hydrochlorination by carrying out in the same chamber the exothermic chlorination of acetylene or of one of its slightly chlorinated derivatives and the de-hydrochlorination of the saturated chlorinated derivative formed, this being carried out in practice by passing a mixture of chlorine and the product to be chlorinated over a suitable catalyst at rest. It was however very rapidly realized that the catalysts aged more quickly as the temperature used increased, and that the two reactions interfered with each other as a result of the formation of numerous secondary products. Thus, in accordance with the German Patent No. 846,847, there are employed as catalysts metallic salts such as barium chloride and cupric chloride or mixtures of these, deposited on an inert support, with the object of producing respectively trichlor-ethylene by de-hydrochlorination of tetrachlorethane, and tetrachlor-ethylene by de-hydrochlorination of pentachlor-ethane. For the same purpose, the German Patent No. 806,456 proposes the use of salts of strong bases and mineral acids, such as sodium sulphate. However, the development of these processes has come up against the fact that they produce tetrachlor-ethylene alone, and that the activity of these catalysts, although it is initially large, falls away very rapidly.

In accordance with other methods, for example that described in French Patent No. 1,055,618, efforts have been made to regulate to the best possible advantage the thermal conditions of the reaction by causing chlorine to react on acetylene in two stages in two successive chambers. In the first chamber, a partial chlorination of the acetylene is effected, the chlorine or the acetylene being diluted with hydrochloric acid. Into a second chamber there is introduced the product passing out of the first chamber and a quantity of chlorine determined in such manner that the amounts of heat produced by the supplement of the exothermic reaction of chlorination and absorbed by the reaction of de-hydrochlorination are almost exactly balanced. The quantity of chlorine introduced into the second chamber in accordance with this known process is comprised between one-third and one-half of the total chlorine employed. This process however does not completely exclude the addition of heat in the second chamber from an external source of heat, which is furthermore necessary if it is desired to obtain a proportion of trichlor-ethylene greater than 30% of the total trichlor- tetrachlor-ethylene. In addition, the apparatus required for the industrial application of the process is bulky, complicated and expensive.

In French Patent No. 1,078,095, another path has been proposed in passing from acetylene to trichlor-ethylene; this consists in passing first from acetylene to trans-1,2 dichlor-ethylene and then by known means from the latter to tetrachlor-ethane, and finally from this latter to trichlor-ethylene. In accordance with the method described in the said patent, in order to pass from acetylene to dichlor-ethylene, the action of cupric chloride in hydrochloric solution on acetylene is employed; the cupric chloride, which is reduced during the course of this action to the form of cuprous chloride, is reoxidized during the course of a separate stage, by various agents such as chlorine or a mixture of oxygen and hydrochloric acid.

The reactions which permit of the transition from acetylene to trichlor-ethylene may be written generally:

(1) 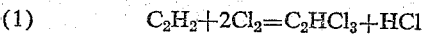$C_2H_2 + 2Cl_2 = C_2HCl_3 + HCl$ in accordance with standard methods, these reactions are carried out by employing two molecules of chlorine and producing one molecule of hydrochloric acid.

On the other hand, the successive reactions indicated by French Patent No. 1,078,095 are as follows:

(2)  $C_2H_2 + 2CuCl_2 \rightarrow C_2H_2Cl_2 + Cu_2Cl_2$
(3a)  $Cu_2Cl_2 + Cl_2 \rightarrow 2CuCl_2$
or
(3b)  $Cu_2Cl_2 + 2HCl + \frac{1}{2}O_2 \rightarrow 2CuCl_2 + H_2O$
(4)  $C_2H_2Cl_2 + Cl_2 \rightarrow C_2H_2Cl_4$
(5)  $C_2H_2Cl_4 \rightarrow C_2HCl_3 + HCl$ It can thus be seen that in one of the methods of carrying out the said patent, that which uses the reactions 2, 3b, 4 and 5, half the total chlorine necessary is supplied in the form of hydrochloric acid (equation 3b); the process thus consumes in all only one molecule of hydrochloric acid, but it retains however the disadvantage of passing through the intermediary of tetrachlor-ethane.

There are still further processes which utilize cupric chloride $CuCl_2$ as the chlorinating agent, which is converted to cuprous chloride and is subsequently re-formed by means of an oxy-chlorination. These various methods differ from each other by the means which they propose in order to carry this reaction into effect. In accordance with the U.S. Patent No. 2,752,402, the chlorides of copper, mixed with an inert substance or carried by it, pass successively into four reaction chambers, in each of which is produced, either the reduction of CuCl$_2$ by contact with the product to be chlorinated, or its re-constitution in two stages in contact with air, with the formation of oxy-chloride of copper in a first chamber, and then hydrochloric acid in a second chamber. In this process, the chlorine-carrying agent is mobile and travels along a circuit during the course of which it is subjected to the successive conversions indicated above.

Finally, in order to obtain trichlor- and/or tetrachlor-ethylene, it has also been proposed to start with ethylene or its slightly chlorinated derivatives, in particular with 1,2 dichlor-ethane (British Patent No. 673,565) sometimes known as "ethylene dichloride" and with 1,1,dichlor-ethane (U.S. Patent No. 2,725,412).

In view of the disadvantages of the known processes and of the difficulties involved in their practical applications, the applicants also have studied the chlorination in the vapor phase of 1,2 dichlor-ethylene with the object of forming directly trichlor- and/or tetrachlor-ethylene. The dichlor-ethylene used may be obtained by any known means.

The present invention relates to a method of preparation in a single stage of a mixture of trichlor- and tetrachlor-ethylene in relative molar proportions comprised between 0 and 80% of trichlor-ethylene, characterized in that a mixture containing chlorine and dichlor-ethylene is passed, preferably at high speed, through a fluidized solid catalytic mass maintained at a temperature between 350 and 450° C., the chlorine and dichlor-ethylene being present in the said mixture in the proportion necessary to obtain in a continuous manner the total fixation of the chlorine by formation of the desired relative quantities of trichlor- and tetrachlor-ethylene.

The process may be carried into effect in the presence of a diluent of chlorine or of dichlor-ethylene.

By "fluidized solid mass" is meant in the present specification a solid mass in the state at present defined by the name of "fixed dense fluidization," that is to say a mass formed of fine solid particles maintained by a flow of gas having a speed corresponding to their granular size, and sufficiently spaced apart from each other for the mass to be able to flow like a liquid, while at the same time the volume apparently occupied is not greater than 120% of the volume apparently occupied by the mass when at rest. This state of dense fluidization is different from the "suspended" or "diluted" state produced by a more violent flow of gas, in which the particles are considerably separated from each other and may occupy volumes several times greater than the volume of the mass at rest. In the state of dense fluidization utilized in the method in accordance with the present invention, the catalytic mass, capable of flowing like a fluid, remains in the chamber in which it has been placed; only the particles which are too fine, generally produced by the abrasive effect of the particles against each other, are carried away out of the fluidized mass; they are often advantageously retained by a dust-extractor and are then led back into the mass or recovered.

In addition to the catalytic effect obtained, the use in such a method of a fluidized mass enables great homogeneity to be obtained in the reaction over the whole of the reactor, and in practice prevents the formation of heavy by-products which reduce the life of the catalyst; the temperature in such a fluidized mass is very uniform, and the thermal exchanges through the walls of the reactor are considerably increased; thus, when the reaction is strongly exothermic, it is possible to dispense with the insertion of cooling tubes in the catalytic mass and, taking account of the heat evacuated by the gases which pass out of the reactor, to make use only of the cooling through the walls of the apparatus, even if this latter is of large diameter.

The catalytic mass should apply simultaneously a chlorinating action to effect the total fixation of the chlorine, and a de-hydrochlorinating action. The catalyst which it comprises may be slightly active such as non-impregnated active carbon, Fuller's earth, cristalba, but the catalyst may also be strongly active and may be constituted for example by one of the products cited above, impregnated with barium chloride and/or with cupric chloride.

The number of molecules of chlorine to be used per molecule of dichlor-ethylene employed depends on the ratio desired between the trichlor- and the tetrachlor-ethylene formed; this proportion may be comprised between 1 and 2; it is preferably chosen between 1 and 1.8 in order to prevent the presence of free chlorine and substantial quantities of hexachlor-ethane in the gases passing out of the reaction zone. The molecular proportion of chlorine to dichlor-ethylene will be for example in the vicinity of 1.67 if it is desired to obtain two molecules of tetrachlor-ethylene for one molecule of trichlor-ethylene, and will be 1.33 if it is desired to obtain one molecule of tetrachlor-ethylene for two molecules of trichlor-ethylene.

The process may be carried out with contact times (duration of passage of the gaseous mixture through the fluidized mass) which are very short (less than 10 seconds). Longer contact times, which remain however within the scope of the invention, do not result in any improvement in the completion of the reaction. Speeds of gas flow are preferably employed between about 3 and 25 cm. per sec., the ratio of height to diameter of the fluidized mass being comprised, following current practice, between 1 and 2, and the dimension of the particles of the mass being chosen as a function of the speed of the gases, between 50 and 500 microns. Speaking generally, the time of contact and the speed of the gases, calculated, as is the usual practice, by assuming the reactor to be empty and the gases at the temperature of the reaction, enable the volume and the granular size to be determined of the fluidized mass which is to be employed.

Between the limits of about 350 and 450°, the working temperatures of the process are preferably comprised between 370 and 400° C. which enables the desired proportions of trichlor- and tetrachlor-ethylene to be most readily obtained. Below 350° C., it would be necessary to employ longer contact times; above 450° C., the proportion of undesirable or unusable heavy by-products such as hexachloro-benzene, hexachloro-butadiene becomes too considerable; between 350 and 450° C., the higher temperatures result in the appearance of heavy by-products and a different distribution of the chlorine employed, resulting in a smaller proportion of trichlor-ethylene and larger proportions of tetrachlor-ethylene and non-converted dichloro-ethylene.

A particularly advantageous manner of carrying out the process consists in establishing a cycle in which there is continuously introduced a mixture consisting of chlorine and dichlor-ethylene which are to be reacted together, and a quantity of more highly chlorinated products, in particular tetrachlor- and pentachlor-ethane, equal to that which passes out of the reaction zone. The applicants have found that it is possible to regulate such a cycle so that the chlorine is completely fixed on the dichlor-ethylene and that the quantities of chlorine and dichlor-ethylene thus consumed are completely converted to trichlor- or tetrachlor-ethylene.

The applicants have also found that in a cycle of this kind, the use of a strongly-active catalyst, which enables the quantities of tetrachlor- and/or pentachlor-ethane in the gases passing out of the reaction zone to be reduced, does not lead to a long period of stability of the cycle because of the falling-off in the catalytic activity during the course of time.

In order to obtain cycles having a stability of longer duration, and in accordance with a further feature of the invention, a very small fraction of the fluidized mass is periodically renewed, for example every 24 hours or every 48 hours, after having removed the corresponding quantity. The applicants have observed the surprising effect produced during the working conditions of the process by the introduction of a very small fraction, comprised between 1 and 10%, of new catalytic mass into a mass the activity of which has decreased in consequence of prolonged use. Thus, by the periodic introduction every 24 hours of a quantity of new catalytic mass representing about 1% of the mass in service, it has been found that at the end of one month the activity of this mass remains sufficiently constant for the contents of tetrachlor- and pentachlor-ethane in the gases passing out of the reaction zone not to vary by more than 5% from their mean value. It has been observed that the quantities of catalytic mass periodically introduced in this way represent a consumption very much less than that which would be involved by the total replacement of the mass, which becomes necessary when the reduction of its de-hydrochlorinating activity results in the contents of tetrachlor- and pentachlor-ethane in the gases passing out of the reactive zone being in excess of the admissible limits.

In accordance with a further feature of the invention, the carrying-away of the fine particles out of the reaction chamber by the flow of gas may be regulated in such manner that the quantity of catalyst thus carried away is at least equal and is preferably slightly greater than the quantity of catalyst which it is desired to eliminate during the same period, in consequence of the reduction in activity of the mass. These fine particles are then retained in an external chamber; their excess with respect to the quantity of catalyst to be eliminated, and therefore to be replaced, is mixed with the quantity of new catalyst which it is desired to add, and this mixture is re-introduced into the fluid layer; when the operation has been carried out in this way, there is no advantage in using a catalyst having low resistance to abrasion which would give a very large quantity of fine particles, resulting in a large consumption of catalyst which is due, not to its ageing, but to the physical effect of abrasion.

There will be given below a certain number of examples of operation (without any implied limitation) of the method which forms the object of the invention.

*Example 1*

In a reactor of 55 cm. in diameter and 1.50 metres in height, cooled externally by a violent current of air, there was placed a layer of 1 metre in thickness of active carbon impregnated with cupric chloride and barium chloride, the granular size being comprised between 200 and 300 microns.

Through this layer is passed a flow of gas containing 1.3 mols, of chlorine to 1 mol. of dichlor-ethylene at a speed of 14 cm. per sec., evaluated at the temperature of reaction for an empty reactor. The flow of gas fluidized the mass, the temperature of which rose to 380° C. with the cooling stopped. This temperature was then kept between 375 and 385° C. by regulating the speed of the flow of cooling air.

There was obtained at the outlet a gaseous mixture consisting of:

0.13 mol. of dichlor-ethylene,
0.38 mol. of trichlor-ethylene,
0.45 mol. of tetrachlor-ethylene,
1.3 mols. of hydrochloric acid, with very small quantities of tetrachlor- and pentachlor-ethane and extremely small quantities of heavy products.

Under these conditions of working, the activity of the catalyst varied very slowly, and after 24 hours working, the composition of the gaseous mixture passing out of the reaction zone was as follows:

0.15 mol. of dichlor-ethylene,
0.26 mol. of trichlor-ethylene,
0.46 mol. of tetrachlor-ethylene,
0.08 mol. of tetrachlor-ethane,
0.01 mol. of pentachlor-ethane,
1.21 mols. of hydrochloric acid.

The slow falling-off in the activity of the catalyst is shown by the progressive appearance of tetrachlor-ethane and pentachlor-ethane in the gases passing out of the reaction zone; it has been found experimentally that in order to complete their de-hydrochlorination, the time of contact of the gases with the aged catalytic mass should have been increased by 25 seconds.

*Example II*

The reactor used was the same as in Example I and contained the same layer of 1 metre in thickness of active carbon impregnated with cupric chloride. Through this layer was passed at a speed of 15 cm. per sec., a flow of gas containing, for 1.1 mols. of chlorine, 0.8 mol. of dichlor-ethylene, 0.5 mol. of tetrachlor-ethane and 0.1 mol. of pentachlor-ethane.

There was rapidly established a state of equilibrium in which the temperature was maintained between 375 and 385° C.; the quantity of tetrachlor-ethane and pentachlor-ethane passing out of the reaction zone corresponded to the quantities introduced, which was furthermore derived from the complete re-use of the quantities passing out; the gases passing out of the reaction zone carried away a quantity of heat sufficient to avoid any artificial cooling of the reaction zone; these gases still contained a little dichlor-ethylene which had not reacted, but a quantity of chlorine less than 0.1%. The quantities passing-out per hour from the reaction zone were as follows:

| | Mols. |
|---|---|
| Dichlor-ethylene | 95 |
| Trichlor-ethylene | 300 |
| Tetrachlor-ethylene | 375 |
| Tetrachlor-ethane | 500 |
| Pentachlor-ethane | 100 |
| Hydrochloric acid | 1080 |

These conditions remained practically stable for 300 hours, at the end of which period, as a result of the falling-off in the activity of the catalyst, chlorine began to make its appearance in the gases.

*Example III*

In a reactor of 26 cm. in diameter, there was placed a layer of 38.5 cm. in thickness of non-impregnated active carbon, of a granular size comprised between 60 and 150 microns.

Through this layer there was passed at a speed of 4.8 cm. per sec. a flow of gas containing for 1.25 mols. of dichlorethylene, 1.35 mols. of chlorine, 0.12 mol. of tetrachlor-ethane, and 0.08 mol. of pentachlor-ethane. After the reaction had become steady, the temperature was maintained constant between 390 and 400° C.; the quantity of tetrachlor-ethane and pentachlorethane passing out of the reaction zone corresponded to the quantities introduced.

The quantities per hour passing out of the reaction zone were as follows:

| | Mols. |
|---|---|
| Dichlor-ethylene | 12 |
| Trichlor-ethylene | 42 |
| Tetrachlor-ethylene | 18 |
| Tetrachlor-ethane | 7.2 |
| Pentachlor-ethane | 4.8 |
| Hydrochloric acid | 81 |

Under these conditions of working, which remained practically stable for about 100 hours, there were produced 70 molecules of trichlor-ethylene for 100 molecules of the total quantity of trichlor- plus tetrachlor-ethylene; the consumption of catalyst was of the order of 10 grams per kilogram of the mixture of trichlor- and tetrachlor-ethylene manufactured.

Example IV

The operations were first carried out as described in Example III. The progressive appearance of unreacted chlorine showed the progressive deterioration of the desired stable conditions. When the quantity of chlorine in the gases passing out of the reaction zone reached 1% of the quantity employed, there was added to the catalytic mass 5% of its weight of fresh catalyst. As soon as this small addition of new catalyst was made, the total disappearance of chlorine was observed in the gases passing out of the reaction zone. After a slight increase of the re-cycled tetrachlor-ethane and pentachlor-ethane, at the end of a few hours the conditions were again restored to approximately those previously obtained, and these were maintained for about 40 hours; the re-appearance of appreciable quantities of unreacted chlorine was then again observed in the gases passing out of the reaction zone. There was then added to the catalytic mass 1% of its weight of a catalyst consisting of active carbon impregnated with cupric chloride; this addition was repeated every 24 hours for a period of 300 hours. During the whole of this period, hourly productions were obtained in the vicinity of those given in Example III; the quantity of chlorine in the gases passing out of the reaction zone was generally maintained in the vicinity of 0.1% of the quantity employed, without ever exceeding 1%. The consumption of catalyst had been reduced to less than 0.5 gram per kilogram of the mixture of trichlor- and tetrachlorethylene obtained.

In the case considered, the quantity of catalyst added corresponded to the losses by abrasion and carrying-off of the fine particles. In other cases, such proportionality was not obtained, and a part of the fine particles carried away was re-introduced into the catalytic mass at the same time as the fresh catalyst.

What we claim is:

1. A method of production in a single stage of trichlor- and tetrachlor-ethylene in relative molar proportions between 0% and 80% of trichlor-ethylene by the chlorination in the presence of catalysts of 1,2-dichlor-ethylene, said method comprising essentially the steps of: passing continuously, at high rates of flow through a fluidized granular mass of catalyst having the property of fixing the chlorine and a de-hydrochlorinating action, maintained at a temperature between 350° and 450° C., a gaseous mixture containing chlorine and dichlor-ethylene in the proportions between 1 and 2 molecules of chlorine per molecule of dichlor-ethylene, fixing substantially the whole quantity of chlorine introduced; and continuously re-cycling with said gaseous mixture a quantity of more highly chlorinated products, including tetrachlor- and pentachlor-ethane, equal to the quantity of said products passing out of the reaction zone.

2. A method as claimed in claim 1, in which the temperature of the said fluidized catalytic mass is maintained between 370° and 400° C.

3. A method as claimed in claim 1, in which the granular size of the said fluidized catalytic mass is between 100 and 500 microns.

4. A method as claimed in claim 1, in which the speed of passage of the said gaseous mixture is between about 3 cm. and 25 cm. per second.

5. A method as claimed in claim 1, in which the period of contact of the said gaseous mixture with the fluidized catalytic mass is comprised between 5 and 10 seconds.

6. A method as claimed in claim 1, in which the molar ratio between the chlorine and the 1,2-dichlor-ethylene is 1.67 in order to obtain two molecules of tetrachlor-ethylene for each molecule of trichlor-ethylene.

7. A method as claimed in claim 1, in which the molar ratio of the chlorine to the 1,2-dichlor-ethylene is 1.33 in order to obtain one molecule of tetrachlor-ethylene for two molecules of trichlor-ethylene.

8. A method as claimed in claim 1, in which a small proportion of said catalytic mass is removed at a predetermined rate, the said proportion moved being replaced at substantially the same rate by a corresponding quantity of fresh catalyst.

9. A method as claimed in claim 8, in which the removal of said small proportion of used catalyst, is effected once every 24 hours.

10. A method as claimed in claim 8, in which the removal of said small proportion of used catalyst is effected once every 48 hours.

11. A method as claimed in claim 8, in which the said small proportion of used catalyst removed amounts to between 1% and 10% of the total catalytic mass.

12. A method as claimed in claim 1, in which the fine particles produced by the abrasive inter-action of the granules of said fluidized granular catalytic mass are carried away by the said gaseous flow at a rate at least equal to the replacement rate necessary to maintain said catalytic mass in its required efficiency of operation.

13. A method as claimed in claim 12, in which the required replacement quantity of fresh catalyst is mixed with any quantity of said fine particles carried away in excess of said replacement quantity, the mixture so produced being added to said fluidized mass.

14. A method as claimed in claim 1, in which the said fluidized catalytic mass is constituted, at least in part, by a catalyst chosen from the group consisting of: active carbon, Fuller's earth and cristalba.

15. A method as claimed in claim 14, in which the said fluidized mass is impregnated with cupric chloride.

16. A method as claimed in claim 14, in which the said fluidized mass is impregnated with barium chloride.

17. A method as claimed in claim 14, in which the said fluidized mass is impregnated with a mixture of cupric chloride and barium chloride.

18. A single stage direct method of producing trichlor- and tetrachlor-ethylene in relative molar proportions between 0–80% of trichlor-ethylene; said method consisting essentially of passing a mixture of 1,2-dichlor-ethylene and chlorine continuously at a high rate of flow through a fluidized granular mass of catalyst having the property of fixing the chlorine and a de-hydrochlorinating action maintained at a temperature between 350–450° C., said mixture consisting essentially of between 1–2 molecules of chlorine per molecule of dichlor-ethylene; fixing substantially the whole quantity of chlorine introduced; and continuously re-cycling with said mixture a quantity of more highly chlorinated products consisting principally of tetrachlor- and pentachlor-ethane, equal to the quantity of said products passing out of said catalyst.

19. A method according to claim 18 wherein said catalyst is maintained between 370–400° C., the granular size of the catalyst is 100–500 microns; the speed of passage of the mixture is between 3–25 cm. per second, and the period of contact of the mixture with the catalyst is between 5–10 seconds.

20. A method according to claim 18 wherein said catalyst is from the group consisting of active carbon, Fuller's earth and cristalba which is impregnated with a member from the group consisting of cupric chloride, barium chloride and mixtures thereof.

21. A method according to claim 18 wherein substantially the whole quantity of chlorine is fixed to form members from the group consisting of trichlor-ethylene and tetrachlor-ethylene, collecting at the outlet from the catalyst mass the so obtained members which also contain a quantity of more highly chlorinated products including tetrachlor-ethane and pentachlor-ethane, the quantity of said products collected at said outlet being equal to the quantity of said products introduced into the catalyst mass with said mixture, and continuously recycling said more highly chlorinated products with said mixture.

22. A direct, single stage process for the manufacture of trichlor-ethylene and tetrachlor-ethylene which comprises reacting a gaseous mixture consisting essentially of chlorine and unsaturated 1,2-dichlor-ethylene in the proportions of 1-2 molecules of chlorine to one molecule of 1,2-dichlor-ethylene in a fluidized reaction zone maintained at a temperature between 350-450° C.; substantially all of the chlorine being fixed in the reaction zone; the reaction period in said zone being 5-10 second; removing the resulting products from said zone; and continuously re-cycling with said mixture a quantity of more highly chlorinated materials containing principally tetrachlor- and pentachlor-ethane; said quantity of recycled more highly chlorinated materials being equal to the quantity of said materials removed from said zone.

References Cited in the file of this patent

UNITED STATES PATENTS

| | | |
|---|---|---|
| 2,178,622 | Basel et al. | Nov. 7, 1939 |
| 2,255,752 | Basel et al. | Sept. 16, 1941 |
| 2,547,139 | Randall | Apr. 4, 1951 |
| 2,725,412 | Conrad | Nov. 29, 1955 |
| 2,938,931 | Thermet et al. | May 31, 1960 |

FOREIGN PATENTS

| | | |
|---|---|---|
| 673,565 | Great Britain | June 11, 1952 |
| 779,565 | Great Britain | July 24, 1957 |